(12) United States Patent  
Cochlovius et al.

(10) Patent No.: US 6,704,646 B2  
(45) Date of Patent: Mar. 9, 2004

(54) NAVIGATIONAL DEVICE

(75) Inventors: Elmar Cochlovius, Villingen-Schwng (DE); Thomas Wagner, Hildesheim (DE); Oliver Wagner, Hildesheim (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 366 days.

(21) Appl. No.: 09/780,220

(22) Filed: Feb. 9, 2001

(65) Prior Publication Data

US 2003/0120422 A1 Jun. 26, 2003

(30) Foreign Application Priority Data

Feb. 10, 2000 (DE) .......................... 100 05 878

(51) Int. Cl.[7] .................................. G08G 1/00
(52) U.S. Cl. ...................... 701/208; 701/213
(58) Field of Search .................. 701/200–213, 701/23–28

(56) References Cited

U.S. PATENT DOCUMENTS 5,721,684 A  2/1998 Takita .................. 364/443

FOREIGN PATENT DOCUMENTS

| DE | 689 24 697 T2 | 6/1996 |
| DE | 196 36 056 A1 | 3/1997 |
| EP | 0 836 167 A1 | 4/1998 |
| EP | 0 583 730 B1 | 5/1998 |

*Primary Examiner*—Richard M. Camby  
(74) *Attorney, Agent, or Firm*—Samuels, Gauthier & Stevens, LLP

(57) ABSTRACT

A navigation unit, especially for vehicles, with a data bus, a data memory on which a plurality of map information items and navigation data are stored, with a navigation computer, connected to the data bus, for route planning, with a data processing unit, connected to the data bus, for processing the data into picture information, the data processing unit containing a picture memory for storing the picture information, with a monitor, connected to the data processing unit, on which the picture information can be displayed, with a communication block with a control unit for entering the start location, intermediate destination, and/or final destination of a trip, such that the data processing unit contains a map memory for storing road map information.

20 Claims, 4 Drawing Sheets

NAVIGATIONAL DEVICE

BACKGROUND OF THE INVENTION

The invention relates to the field of motor vehicle navigation systems, and in particular to a modular navigation system that includes a display.

The main components of such a navigation unit or vehicle navigation system are a control unit for entering the starting point, intermediate destinations, and/or final destination; a data medium for navigation data (e.g., for information to display road maps); a navigation computer to plan the route and provide guidance to the destination; and a data processing unit to process the data into picture information The data processing unit generally includes a picture memory to store the picture information as well as a screen and a display unit to display road maps, position information, destination information, etc. The individual components communicate over a data bus, which in particular can also be an optical data bus. Such navigation units frequently also have a number of sensors to determine the vehicle position, its speed, orientation, etc.

U.S. Pat. No. 5,689,252 discloses a navigation unit that includes a microcontroller as its central unit. A data input device, a GPS signal receiver, a direction sensor, a distance sensor, and a traffic information receiver are connected to this microcontroller. A data memory that includes stored information about the road network, especially road maps, is also connected to the microcontroller. Data conducted from these components to the microcontroUer are made available to a navigation computer so that it can plan the route. The data calculated in this way are then displayed on a screen, which is likewise connected to the microcomputer. It should be noted that especially road map information cannot be displayed directly, but first must be transformed into picture information.

Newer systems give the user the capability of selecting the picture section by zoom or scroll functions. Furthermore, in such systems, the direction and motion of the vehicle is frequently shown on the road maps appearing on the screen. These socalled user demands (e.g., zoom or scroll functions) and system demands (e.g., vehicle motion) continuously change the display picture information, and must be continuously updated from suitable road map information.

The above arrangement of conventional navigation units or vehicle navigation systems allows road map information to be retrieved by the navigation computer individually for each displayed picture and to be put into the intermediate storage in the picture memory.

European Patent EP 0 306 088 A1 describes a new generation navigation unit. In this navigation unit, the individual components are connected to one another over a data bus. Such a linkage is customary in socalled linked driver information systems. The advantage of such linked driver information systems is that a nearly arbitrary number of individual components can be linked to one another over a data bus line. For example, a screen can be used not only to display navigation data, road maps, etc., but, for example, can also indicate a defect in the vehicle or the like.

The navigation unit described in European Patent EP 0 306 088 A1 includes a data bus, a data memory, in which a large number of road maps and navigation data is stored; a navigation computer to plan the route; and a data processing unit to process data into picture information. The data processing unit includes picture memory to store the picture information. The navigation unit also includes a screen, connected to the data processing unit, on which the picture information can be displayed, and a communication block with a control unit for entering the start position, intermediate destinations, and/or the final destination. The data memory, navigation computer, data processing and display are all connected to the data bus.

In such a system, the picture information of each road map is loaded individually into the picture memory. Such picture information is always transferred over the bus line. If the user wants to change, for example, the current screen display or if the motion of the vehicle requires the picture information to change continuously, the transfer of road map information from the data memory to the picture memory must occur continuously. For a screen display with sufficient picture refresh cycles, the data bus must have a large bandwidth, which generally is not available. Furthermore, the data bus is needed almost exclusively for transferring picture information, so that other information or data cannot be transferred or can be transferred only serially during the remaining interim times.

To elucidate this system, the above restrictions will be explained in terms of two examples:

In a first generation navigation unit, as shown in FIG. 1, the central unit is a navigation computer 1. External information is conducted to this navigation computer 1. In this example, the navigation computer obtains this information from a sensor block 10, a data memory 2, and a communication block 20.

In this example, the sensor block 10 contains a direction sensor 12 and a position sensor 13. The data memory 2 stores information about road networks This includes in particular information for displaying road maps, information about road signs, information about speed limits on the roads, and other navigation data. This data memory 2 generally is a CD-ROM, but any other storage medium is also conceivable, The data stored in the data memory 2 require updating at longer time intervals; in this example, the communication block 20 has the purpose of conducting to the navigation computer 1 navigation data which are constantly changing, Thus, the communication block 20 includes a control unit 21 for entering the destination and setting the screen functions, especially for selecting a road map section (zoom and/or scroll functions). Furthermore, a traffic data receiver 22 is also associated with this communication block 20. For example, this receiver can receive current traffic information from various radio stations, and can process this information appropriately.

Data conducted from the sensor block 10, the data memory 2 and the communication block to the navigation computer 1 are used by the navigation computer 1 to plan a route and to guide the driver to his destination. The road map display calculated in this way should then be conducted to a screen 4. However, the road map information, created by the navigation computer 1, cannot be displayed directly, but must first be converted into picture information by a suitable transformation. In present navigation systems or navigation units, a data processing unit 30 for this purpose is usually directly associated with the navigation computer 1.

In the example of FIG. 1, the transformation of road map information and the picture information, which is performed in the data processing unit 30, is accomplished by a transformation unit 31. The road map information, which has been converted into picture information by the transformation unit 31 is then stored in the picture memory 32 and displayed on the screen 4.

The data furnished by the sensor block 10 are needed by the navigation computer 1 for route planning and destination guidance, and to show the motion of the vehicle on the screen 4. Furthermore, such navigation units usually make it possible for the user to select a road map section for viewing. For this purpose, the user can implement zoom and/or scroll functions. Such user requests are identified by the reference symbol B. Requests which are transmitted directly from the vehicle and on the basis of which the picture information changes are identified in this example as system requests S. Such a system request S preferably is issued on the basis of the data that are made available from the sensor block 10. In the drawing, for the sake of clarity these system requests S and user requests B are conducted to the navigation computer 1 on the request line 6.

FIG. 1 shows the arrangement of a first generation vehicle navigation system or navigation unit. In such a system, extensive storage of road map information in the data processing unit 30 can be eliminated. Storing the picture information in the picture memory 32 is sufficient, since the road map information for each picture can be provided individually by the navigation computer 1, by accessing the data memory 2 as necessary. However, the data processing unit 30 is unable to process user requests B and/or system requests S and to generate new picture information from this.

In second generation navigation systems, the navigation unit is integrated into a complex driver information system, which transmits current data to the driver, for example about the state of his vehicle, malfunctions, etc. The driver information system typically includes sensors, input devices, radio receivers, amplifiers, loudspeakers, display devices, monitors, etc., which are linked through a common, standardized bus.

FIG. 2 illustrates the individual components of a navigation unit integrated into a driver information system. In particular, FIG. 2 shows how such a navigation unit, in accordance with European Patent EP 0 306 088, can be realized with the individual components from FIG. 1, by a bus structure.

A navigation computer 1, a data memory 2, a control unit 39, and a sensor block 10 are connected to a data bus 3. A communication block 20 and a transformation unit 31 are likewise connected. The transformation unit 31 is connected to a picture memory 32, and the picture memory 32 again is connected to a screen 4.

The communication block 20 and the transformation unit 31 are designed as standard modules, and consequently can be actuated by the navigation system, the navigation unit itself, or other devices connected thereto. The separation of the navigation computer 1 and the screen 4, which is connected to the data bus 3 via the transformation unit 31 and the picture memory 32, has a result that, due to the limited bandwidth of the data bus line 3 and the need for transmission between other components connected to the data bus 3, the picture on the screen 4 can be renewed only at relatively long time intervals. System requests S and/or user requests B, as indicated in FIG. 1, thus can generally not be processed at all or else their discontinuous picture display cannot be assured.

It is therefore an object of the invention to present a navigation unit which is suited for networked driver information systems, and in which road map information can be transmitted from the navigation computer to the data processing unit and thus to the screen in such a way that, even with a limited bandwidth of the data bus, an adequate picture refresh rate is still possible

SUMMARY OF THE INVENTION

Briefly, according to an aspect of the present invention, a motor vehicle navigation system includes a data bus and a navigation computing device connected to the data bus. The system also includes a first memory device that is the data bus and contains map data, and a data processing unit connected to the data bus. The data processing unit includes a second memory device and a control unit that receives a user request and in response thereto selectively transmits a control unit request over the data bus to the first memory device for new map data, which is transmitted over the data bus and received by the control unit and stored in the second memory device. The control unit processes the received map data to form a display image output signal responsive to the user request.

The essential idea of the invention is that the data processing unit itself has a road map memory for storing road map information. This road map memory puts into intermediate storage the information that has already been transmitted by the navigation computer This information is locally available in the data processing unit and is available for screen display as needed, without communication with the navigation computer being necessary. Therefore, the information in the data processing unit is used more than once, which reduces the load on the bus. Not until picture information which exists only in the data memory connected to the data bus needs to be displayed, is access to the navigation computer and thus to the data bus necessary, since the latter responds by transmitting the needed information. This newly-transmitted information displaces the outmoded and no longer necessary information, as needed, from the road map memory of the data processing unit Direct access of the data processing unit to the data memory is counterproductive due to the software modularity of the navigation computer.

However, in general, modularization facilitates expansion or replacement of individual components. For this reason, modularization cannot be dispensed with. The invention achieves a maximum of flexibility in this regard in that the navigation computer and the data processing unit are designed as modules, which are implemented with two separate microprocessors.

Since the vehicle usually moves continuously, suitable data management in the data processing unit makes it possible to detect already at an early stage which road map information will be needed subsequently due to the vehicle motion. This information can already be requested prospectively from the navigation computer (look-ahead principle), so that more time is available for its transmission. This further reduces the bandwidth required for the data bus, and thus correspondingly relieves the network.

In one embodiment, the data bus is designed as a "Media-Oriented Synchronous Transfer" —(MOST) or as a "Multi-Media Link" (MML) bus. In combination with the above-mentioned modular structure, such standardized buses ensure that the inventive navigation system can easily be integrated into nearly all current vehicle brands.

The communication block has a control unit for inputting a user request to change the current picture information, and a traffic data receiver for receiving current traffic information. It makes no difference whether this information is conducted directly to the navigation computer or via the data bus The control unit for inputting user requests can also be associated with the data processing unit, for example, if input is made, for example, through a touch-screen.

Furthermore, the invention specifies that a sensor block for acquiring position data is associated with the navigation computer. For acquiring position data, a position sensor, for example, can detect the instantaneous actual position and/or a direction sensor can detect the instantaneous orientation of the vehicle, A speedometer and/or tachometer can also be coupled to the system.

It is anticipated that the position data detected by the sensor block will contain a system request for changing the current picture information. The user request entered into the control unit and/or the system request made available, for example, by the sensor block, are conducted to the data processing unit. The latter suitably transforms a road map from the map memory into picture information or requests further map information from the navigation computer.

These and other objects, features and advantages of the present invention will become more apparent in light of the following detailed description of preferred embodiments thereof, as illustrated in the accompanying drawings.

DETAILED DESCRIPTION OF THE INVENTION

Figure 3:
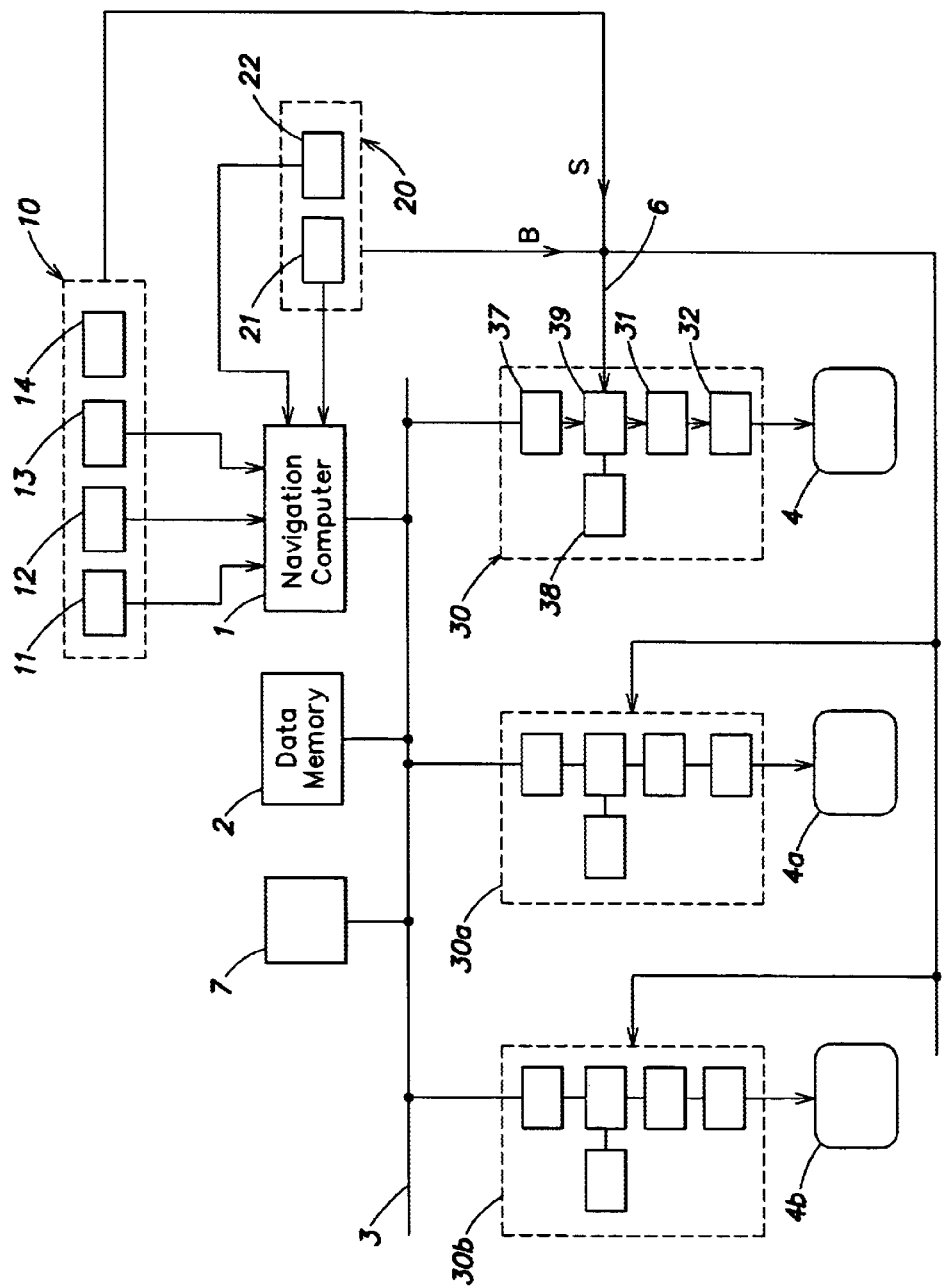
FIG. 3 is a block diagram illustration of a navigation unit.

FIG. 3 is a block diagram illustration of a navigation unit. The navigation unit includes a navigation computer 1, a data memory 2, and a data processing unit 30, each connected to a data bus 3. In the example, other components connected to the data bus are represented for the ease of illustration by a single block 7.

Figure 1:
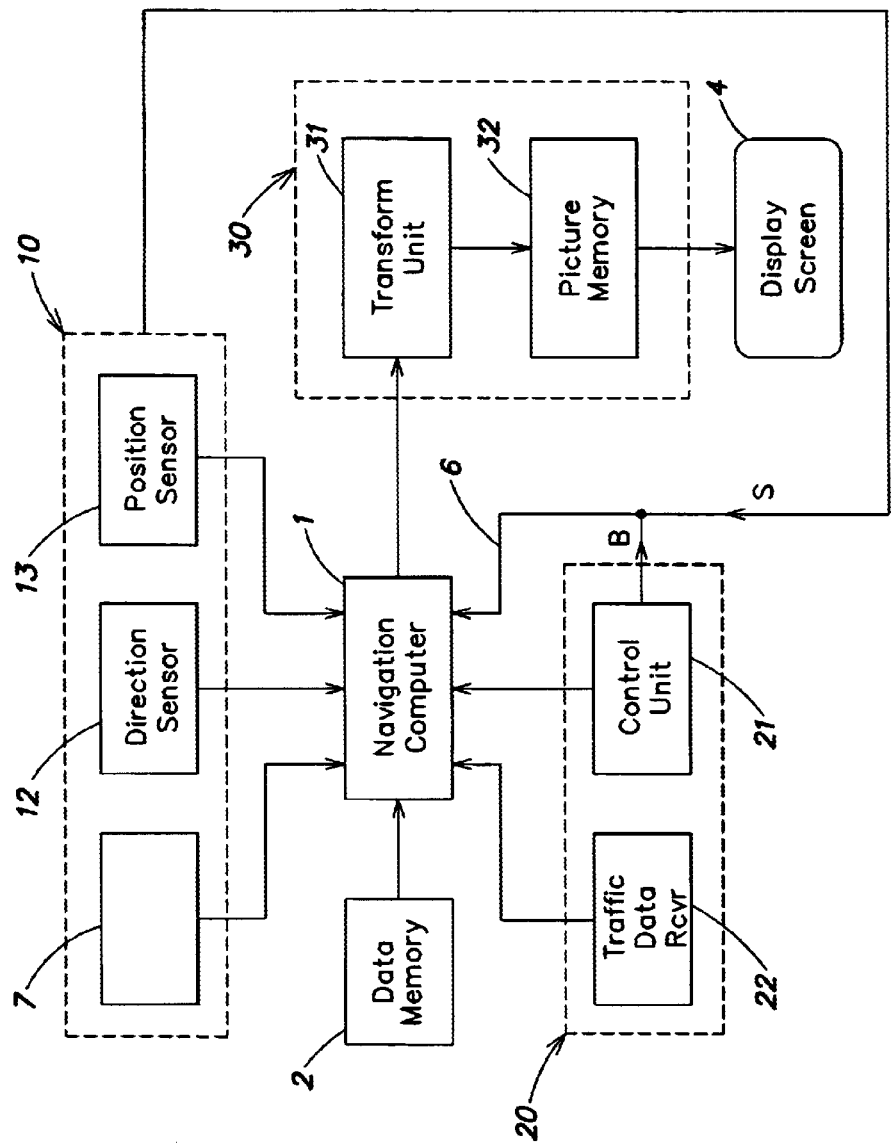
FIG. 1 shows an arrangement of a navigation unit of the first generation without a data bus, according to the prior art.
Figure 2:
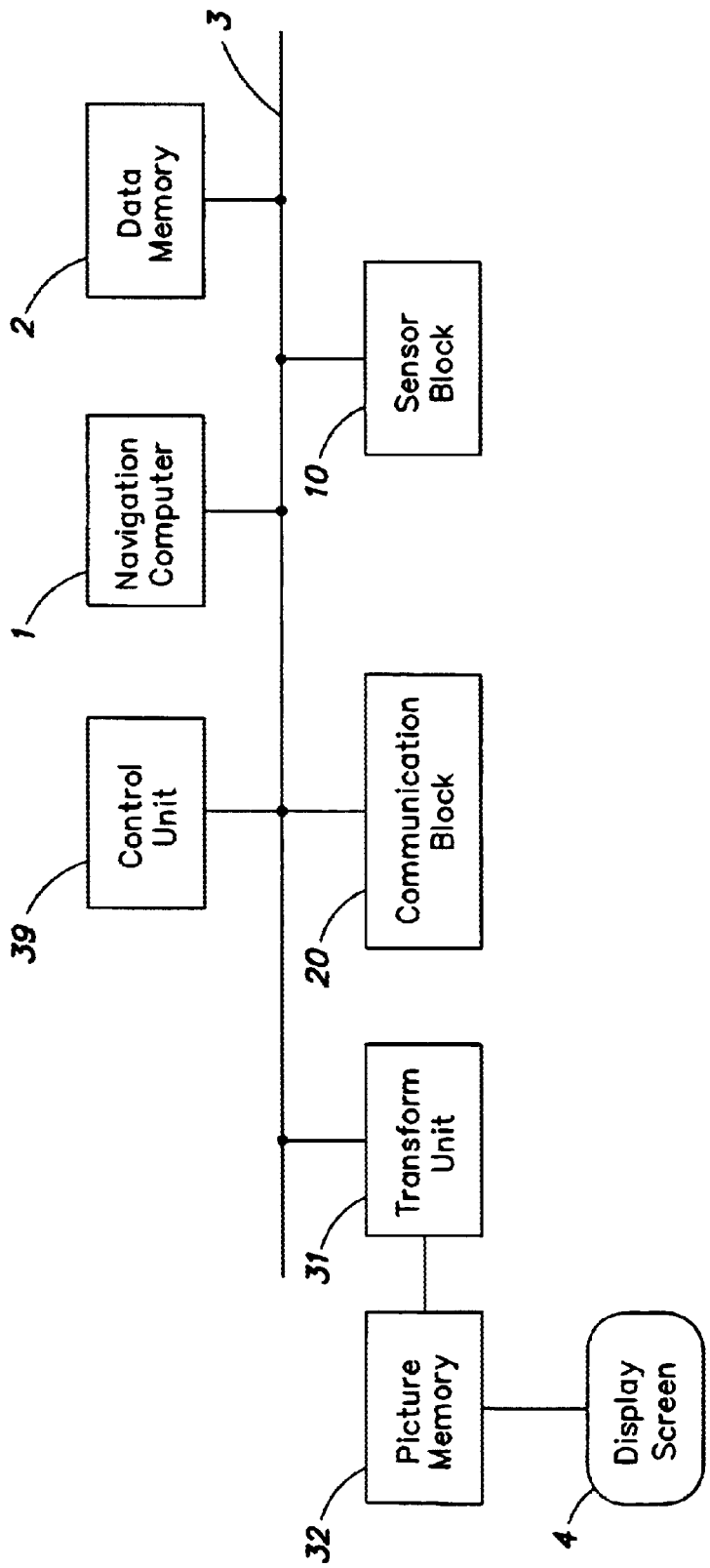
FIG. 2, shows a navigation unit of the second generation with a data bus according to the prior art.

As in the first generation navigation unit of FIG. 1, data are conducted to the navigation computer 1. The sensors 10 include a speedometer 11, a direction sensor 12, a position sensor 13, and a tachometer 14. Furthermore, analog information is conducted to the navigation computer 1 from the communication block 20, which includes control unit 21, and traffic data receiver 22. Of course, this information from the communication block 20 and the sensor block 10 can be transmitted over the data bus 3.

User requests B and system requests S which in this example are transmitted from the control unit 21 or the sensor block 10, are not conducted to the navigation computer 1, but rather over the request line 6 of the data processing Unit 30 Therefore, while in a traditional navigation system the new requests S and B are processed by the navigation computer 1, according to an aspect of the invention, new request SIB is processed essentially locally in the data processing unit 30, A control unit 39 precedes the monitor 4, the picture memory 32, and the transformation unit 31. This control unit 39 receives the user requests B and the system requests S via the request line 6. The map memory 38 is connected to this control unit 39. The map memory 38 can store larger quantities of road map information that is conducted from the data memory 2 via the data bus 3 to the navigation computer 1. The control unit 39 itself is for this purpose connected to the data bus 3 through a network adapter 37.

In an alternative embodiment, the data memory 2 is not connected to the data bus 3 but to the navigation computer 1.

According to the invention, the data processing unit 30 is designed in such a way that user requests B and system requests S can be processed independent of the navigation computer 1 (i.e., locally). New map information is requested actively from the navigation computer 1 only as needed, according to the clientserver principle. The map memory 38, which is situated next to the picture memory 32 in the data processing unit 30, provides intermediate storage of the map information transmitted from the navigation computer 1.

Under the assumption that user requests B and system requests S can largely be processed with locally available map information in the map memory 38 (cache principle), the current screen content can be calculated from the map memory 38 without communicating with the navigation computer 1. Significantly, the map information in the data processing unit 30 is used not only once but several times, thus reducing the bus load. Advantageously, due to reduced inquiries of the data processing unit 30, the navigation computer 1 is able to supply several data processing units 30, 30a, 30b with data. This makes it possible to display different map sections on several independent screens 4, 4a, 4b, for example the current environment and the environment of the destination.

If the user or system requests B, S requires access to map information which is not available in the map memory 38 of the data processing unit 30, map information is requested from the navigation computer 1. The navigation computer 1 responds by transmitting the necessary map information. Newly transmitted map information replaces outmoded and no longer needed map information from the map memory 38 of the data processing unit 36, as appropriate As the vehicle moves, suitable calculations and control operations of the control unit 39 within the data processing unit make it possible to detect at an early stage what map information will be needed on the basis of the system requests S. Therefore, the map information can be requested from the navigation computer 1 prospectively and conducted to the map memory 38. Consequently, more time is available for this transmission. This again reduces the bandwidth needed for the data bus 3 and correspondingly relieves the entire network.

Figure 4:
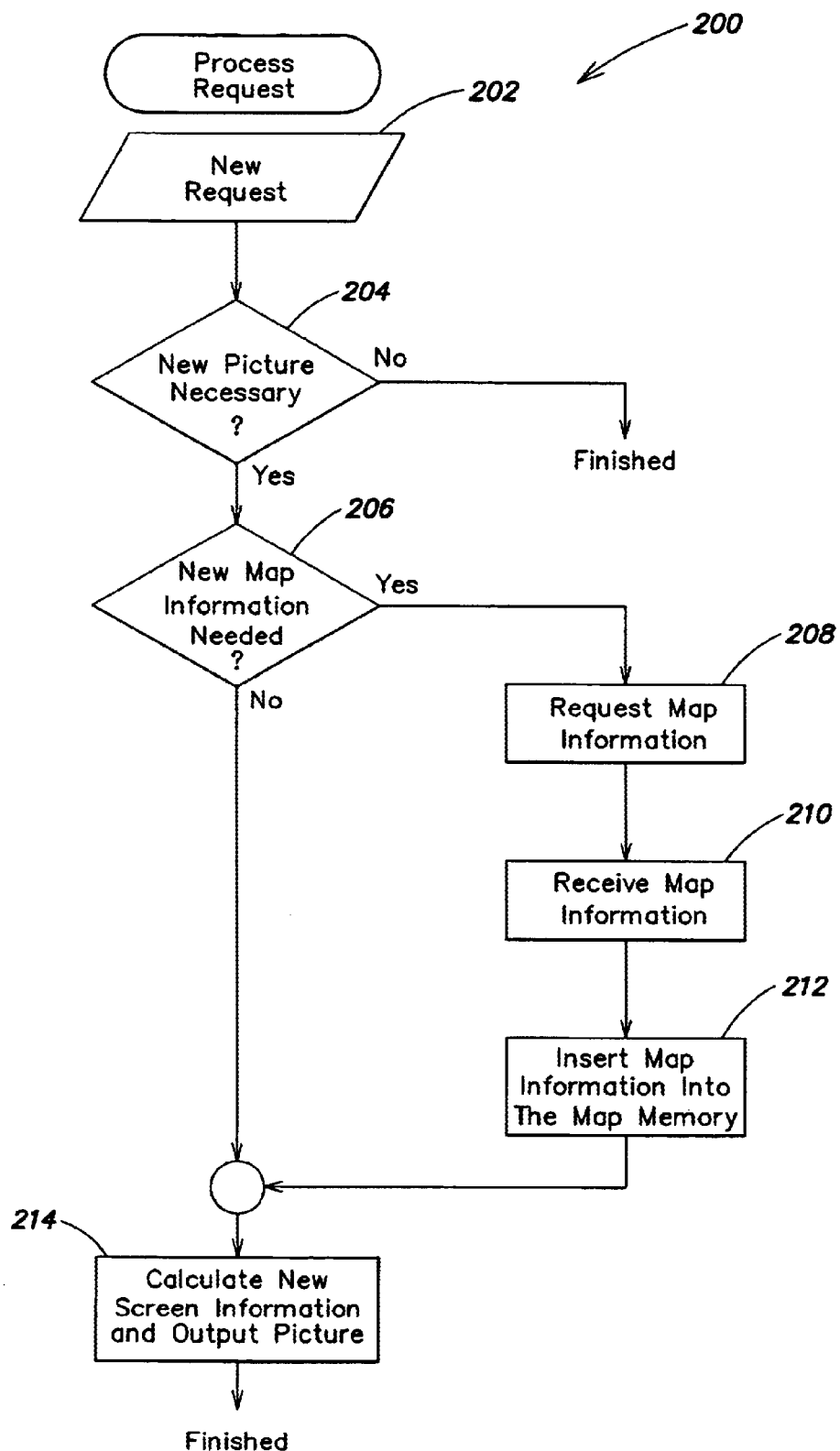
FIG. 4 is a flowchart illustration of the management and processing of the road maps stored in the map memory of the data processing unit.

FIG. 4 is a flowchart illustration of processing 200 associated with responding to a request for new map information. Following the receipt of a new request (i.e., a user request or a system request) in step 202, step 204 is performed to determine if a new picture is required. If it is not, then the processing is finished, However, if a new picture is required, step 206 is performed by the control unit 39 to determine if new map information is required. This test is performed by the control unit 39 determining if the map memory 38 includes data for the new picture to be calculated/formed.

If step 206 determines that new map information is required, in step 208 the control unit 39 requests new map information from the navigation computer 1 via the data bus. Since the map information usually is available in whole pages, whole pages are typically transmitted. In response, the navigation computer sends the requested map information, which is received via the network adapter of the data processing unit in step 210, and stored in the map memory in step 212. The excessive map information that has initially been transmitted due to the page partitioning, is then available immediately in case of further continuous system requests S (look-ahead principle).

Following step 212, all map information needed due to the requests B, S is present in the map memory 38. The new map information can then be calculated in the transformation unit 31 in step 214, stored in the picture memory 32, and outputted on the screen 4.

Processing of the request is thus completed.

Although the present invention has been shown and described with respect to several preferred embodiments thereof, various changes, omissions and additions to the form and detail thereof, may be made therein, without departing from the spirit and scope of the invention.

What is claimed is:

1. A motor vehicle navigation unit, comprising:
   (a) a data bus;
   (b) a data memory on which a plurality of map information items and navigation data are stored;
   (c) a navigation computer connected to said data bus, for route planning;
   (d) a data processing unit, connected to said data bus, for processing the data into picture information, said data processing unit containing a picture memory for storing the picture information;
   (e) a monitor, connected to the data processing unit, on which the picture information can be displayed;
   (f) a communication block with a control unit for entering the start location, intermediate destination, and/or final destination of a trip,
      characterized in that said data processing unit contains a map memory for storing road map information.

2. The navigation unit of claim 1, wherein the data processing unit contains a control unit for prospectively requesting map information.

3. The navigation unit of claim 1, wherein the communication block contains a control unit for entering a user request (B) to change the current picture information.

4. The navigation unit of claim 3, wherein the communication block contains a traffic data receiver to receive current traffic information.

5. The navigation unit of claim 4, wherein the sensor block to acquire position data is associated with the navigation computer.

6. The navigation unit of claim 5, wherein the sensor block for acquiring position data has a position sensor to acquire the actual instantaneous position.

7. The navigation unit of claim 5, wherein in order to acquire position data, the sensor block has a direction sensor to acquire the instantaneous orientation of the vehicle and/or a speedometer and/or a tachometer.

8. The navigation unit of claim 5, wherein the position data acquired by the sensor block effects a system request (S) directly in the data processing unit, which results in changing the current picture information.

9. The navigation unit of claim 8, wherein the data processing unit has a control unit to manage and process the road maps stored in the map memory.

10. The navigation unit of claim 9, wherein the control unit is actuated by a user request (B) and/or a system request (S) to manage and process the road data stored in the map memory.

11. The navigation unit of claim 10, wherein the data bus includes an MOST bus or an MML bus.

12. A data processing unit for use in a motor vehicle navigation system that includes a data bus, a navigation computing device connected to the data bus and a first memory device that includes map data is connected to the data bus, wherein said data processing unit is connected to the data bus, and comprises:
   a second memory device; and
   a control unit that receives a user request and in response thereto transmits a control unit request over the data bus to the navigation computing device for new map data, which is transmitted over the data bus and received by said control unit and stored in said second memory device, wherein said control unit processes said received map data to form a display image output signal responsive to said user request.

13. The data processing unit of claim 12, further comprising:
   a transform unit that receives said display image output signal and converts said output signal to picture data; and
   picture memory that receives and stores said picture data and output picture data to a display device.

14. A motor vehicle navigation system, comprising:
   a data bus;
   a navigation computing device connected to said data bus;
   a first memory device that includes map data and is connected to said data bus;
   a first data processing unit connected to said data bus, wherein said data processing includes:
      (iii) a second memory device; and
      (iv) a control unit that receives a user request and in response thereto transmits a control unit request over said data bus to said navigation computing device for new map data, which is transmitted over said data bus and received by said control unit and stored in said second memory device, wherein said control unit processes said received map data to form a display image out signal responsive to said user request.

15. The motor vehicle navigation system of claim 14, further comprising:
   a transform unit that receives said display image output signal and converts said output signal to picture data; and
   picture memory that receives and stores said picture data and provides stored picture data to a display device.

16. The motor vehicle navigation system of claim 14, wherein said data bus includes a media-oriented synchronous transfer bus.

17. The motor vehicle navigation system of claim 14, wherein said control with also receives system requests and in response thereto transmits said control unit request over said data bus to said memory device for map data.

18. The motor vehicle navigation system of claim 17, comprising a sensor block that provides said system request, wherein said sensor block comprises a direction sensor and a position sensor.

19. The motor vehicle navigation system of claim 18, comprising a communication block that provides said user request, wherein said communication block includes a user input device.

20. The motor vehicle navigation system of claim 14, comprising a second data processing unit connected to said data bus.

* * * * *

UNITED STATES PATENT AND TRADEMARK OFFICE
CERTIFICATE OF CORRECTION

PATENT NO. : 6,704,646 B2
DATED : March 9, 2004
INVENTOR(S) : Cochlovius et al.

It is certified that error appears in the above-identified patent and that said Letters Patent is hereby corrected as shown below:

Column 1,
Line 39, delete "microcontrolUer" and insert -- microcontroller -- before the words "are made"
Line 41, after "These" and before "user" delete "socalled" and insert -- so called --

Column 2,
Line 31, after "networks" insert a period -- . --
Line 36, after "conceivable" insert a period -- . --
Line 40, after "changing" insert a period -- . --
Line 49, after "block" insert -- 20 --

Column 4,
Line 29, after "unit" insert a period -- . --
Line 50, between the words "Transfer" and "(MOST)" insert a hyphen -- - --
Line 60, after "bus" insert a period -- . --

Column 5,
Line 2, after "vehicle" insert a period -- . --
Line 20, after "prior art" insert a semi-colon -- ; --
Line 46, after "S" and before "which" insert a comma -- , --
Line 50, delete "Unit" and insert -- unit --; and after "30" insert a period -- . --
Line 53, delete "SIB" and insert -- S/B --
Line 54, after "unit 30" delete the comma "," and insert a period -- . --

Column 6,
Line 24, after "user" and before "or system requests B," insert a hyphen -- - --; and after "S" and before "requires" insert a hyphen -- - --
Line 31, after "unit" delete "36" and insert -- 30 --
Line 47, after "finished" delete the comma "," and insert a period -- . --

UNITED STATES PATENT AND TRADEMARK OFFICE
CERTIFICATE OF CORRECTION

PATENT NO. : 6,704,646 B2
DATED : March 9, 2004
INVENTOR(S) : Cochlovius et al.

It is certified that error appears in the above-identified patent and that said Letters Patent is hereby corrected as shown below:

Column 8,
Line 26, delete "(iii)" and insert -- (i) --
Line 27, delete "(iv)" and insert -- (ii) --

Signed and Sealed this

Twentieth Day of July, 2004

JON W. DUDAS
*Acting Director of the United States Patent and Trademark Office*